Patented May 9, 1939

2,157,203

UNITED STATES PATENT OFFICE 2,157,203

DEHYDROGENATION OF HYDROCARBONS

Aristid V. Grosse and Julian M. Mavity, Chicago, Ill., assignors to Universal Oil Products Company, Chicago, Ill., a corporation of Delaware No Drawing. Application September 30, 1937, Serial No. 166,580

5 Claims. (Cl. 260—666)

This invention relates particularly to dehydrogenation of cyclic saturated hydrocarbons. In a more specific sense it is concerned with a process for selectively dehydrogenating cyclopentane to produce relatively high yields of cyclopentadiene corresponding to the loss of 2 molecules of hydrogen.

The art of selectively dehydrogenating hydrocarbons while retaining their essential molecular structure or carbon atom configuration has been developed principally upon an empirical basis and usually involves selected conditions of operation in respect to temperature, pressure, rates and the use of specially prepared catalytic materials. Even under the most carefully selected conditions particularly with the more reactive catalysts there are numerous side reactions occurring corresponding to the degradation of the original molecules to form lower molecular weight compounds and recombinations of initially formed radicals to form secondary condensation products, some of which are of high molecular weight and condensed cyclic structure. The present invention comprises a development in the art of specifically dehydrogenating hydrocarbons to produce relatively high yields of products corresponding to simple dehydrogenation reactions.

In one specific embodiment the present invention comprises the treatment of cyclopentane to produce substantial yields of cyclopentadiene therefrom by passing the vapors of said cyclopentane over a catalyst comprising essentially chromium sesquioxide on activated alumina while controlling temperature, pressure and time of contact to produce optimum results.

Cyclopentane is the cycloparaffin corresponding to 5 carbon atoms in the ring and having the general overall formula $C_5H_{10}$. It is a liquid at ordinary temperatures having a boiling point of 49° C. and a specific gravity of 0.7635 at 4° C. In general it has relatively greater stability than either cyclohexane on the one hand or cyclobutane on the other, these last named compounds being those with 6 and 4 carbon atoms in the ring respectively. The structural formulas of cyclopentane and cyclopentadiene constituting the material treated and the principal product of the present process are given below:

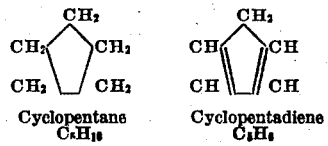

Cyclopentane
$C_5H_{10}$

Cyclopentadiene
$C_5H_6$

In the operation of the process of the invention cyclopentane is vaporized and passed over a particular type of granular catalyst at temperatures within the range of 500–700° C., pressures from atmospheric to subatmospheric of the order of 0.25 atmospheres absolute and for times of contact of approximately 0.5 to 6 secs. The vapors may be mixed with inert gases as an alternative method to operating under reduced pressure. The products are cooled and fractionated and cyclopentadiene recovered by fractionation or chemical methods. The major product of the reaction is a colorless liquid boiling at 41° C. which is intensely reactive and is violently attacked by both acids and alkalies. It reduces ammoniacal silver solution and rapidly polymerizes at ordinary temperatures to a bi-molecular compound, dicyclopentadiene, which boils at 88° C. under a pressure of 35 mm. and which at ordinary pressures boils at 170° C. with substantial reconversion to the simple molecule of cyclopentadiene.

The preferred catalyst for use in the process under the operating conditions already specified consists of activated alumina supporting minor proportions by weight of chromium sesquioxide. It is essential to the preparation of these catalysts that the aluminum oxide possess certain structural characteristics permitting the maintenance of a stable deposit of the chromium sesquioxide on its surface which is essentially undisturbed under the conditions of operation and when regenerating by burning off carbonaceous deposits with air or other oxygen-containing gas mixtures. Aluminum oxide which is generally preferable as a base material for the manufacture of catalysts for the process may be obtained from some natural aluminum oxide minerals or ores such as bauxite or carbonates such as Dawsonite by proper calcination, or it may be prepared by precipitation of aluminum hydroxide from solutions of aluminum sulfate, nitrate, chloride, or different other salts, and dehydration of the precipitate of aluminum hydroxide by heat. Usually it is desirable and advantageous to further treat it with air or other gases, or by other means to activate it prior to use.

Two hydrated oxides of aluminum occur in nature, to wit, bauxite having the formula $Al_2O_3.2H_2O$ and diaspore having the formula $Al_2O_3.H_2O$. Of these two minerals only the corresponding oxide from the bauxite is suitable for the manufacture of the present type of catalysts and this material in some instances has given the best results of any of the base compounds whose use is at present contemplated. The mineral dawsonite having the formula Na₃Al(CO₃)₃.2Al(OH)₃ is another mineral which may be used as a source of aluminum oxide, the calcination of this mineral giving an alkalized aluminum oxide which is apparently more effective as a support in that the catalyst is more readily regenerated after a period of service. Alumina in the form of powdered corundum is not suitable as a base.

It is best practice in the final steps of preparing aluminum oxide as a base catalyst to ignite it for some time at temperatures within the approximate range of from 600–700° C. This does not correspond to complete dehydration of the oxide but gives a catalytic material of good strength and porosity so that it is able to resist for long periods of time the deteriorating effects of the service and regeneration periods to which it is subjected.

The element chromium has several oxides, the four best known being $CrO$, $Cr_2O_3$, $Cr_3O_4$, and $CrO_3$. The sesquioxide $Cr_2O_3$ is readily produced by heating salts of chromium or the trioxide in hydrogen or hydrocarbon vapors at temperatures above 300° C. The dioxide has been considered to be an equimolecular mixture of the trioxide and the sesquioxide. The oxides are readily developed on the surfaces and pores of alumina granules by utilizing primary solutions of chromic acid $H_2CrO_4$ or chromium nitrate $Cr(NO_3)_3$. The ignition of the chromic acid, the nitrate or a precipitated trihydroxide produces primarily the trioxide which is then reduced to the sesquioxide to furnish one of the catalytic oxides.

It has been found that there is substantially no advantage in utilizing catalysts for the present type of reaction which have more than 10% by weight of chromium sesquioxide on alumina and that best practice requires about 4% when considering the efficiency of the catalyst, cost of materials, and the cost of catalyst preparation. The use of these relatively small amounts of chromium sesquioxide on the alumina apparently prevents the gradual crystallization of the chromium oxide under the conditions of operation so that the composite catalyst has a relatively long life. Furthermore, the regeneration of the catalyst after a period of service is readily accomplished by heating in a current of air at temperatures of the same order as those employed in the dehydrogenation reactions. In the oxidizing step some of the higher oxides may be formed which combine with the alumina to form chromates but these are quickly reduced and decomposed when the catalyst is again contacted with the hydrocarbon vapors.

The following example is given to indicate the general character of the results obtainable by the present process although not with the intention of unduly limiting its scope.

Vapors of cyclopentane are passed over a granular catalyst consisting of approximately 96% by weight of activated alumina and 4% by weight of chromium sesquioxide at a temperature of 500° C., an absolute pressure of 0.25 atmospheres and at a rate corresponding to a contact time of approximately 2 seconds. From 8–10% of cyclopentadiene was obtained in a single pass and by recirculation of unconverted cyclopentane an ultimate yield of about 35% of cyclopentadiene was obtained. The cyclopentadiene was identified by means of its maleic anhydride addition product which melted at 162° C.

The nature of the present invention is obvious from the preceding descriptive specification and the experimental data in the example although neither section is intended to be unduly limiting.

We claim as our invention:

1. A process for dehydrogenating cyclopentane to produce substantial yields of cyclopentadiene which comprises vaporizing said cyclopentane and passing the vapors under dehydrogenating conditions over a granular catalyst comprising essentially a major proportion of activated alumina supporting a minor proportion of chromium sesquioxide.

2. A process for dehydrogenating cyclopentane to produce substantial yields of cyclopentadiene which comprises vaporizing said cyclopentane and passing the vapors at a temperature within the range of 500–700° C. over a granular catalyst comprising essentially a major proportion of activated alumina supporting a minor proportion of chromium sesquioxide.

3. A process for dehydrogenating cyclopentane to produce substantial yields of cyclopentadiene which comprises vaporizing said cyclopentane and passing the vapors at a temperature within the range of 500–700° C. under pressures of from 0.25 to 1 atmosphere absolute over a granular catalyst comprising essentially a major proportion of activated alumina supporting a minor proportion of chromium sesquioxide.

4. A process for dehydrogenating cyclopentane to produce substantial yields of cyclopentadiene which comprises vaporizing said cyclopentane and passing the vapors at a temperature within the range of 500–700° C. under pressures of from 0.25 to 1 atmosphere absolute for times of from 0.5 to 6 seconds over a granular catalyst comprising essentially a major proportion of activated alumina supporting a minor proportion of chromium sesquioxide.

5. A process for dehydrogenating cyclopentane to produce substantial yields of cyclopentadiene which comprises vaporizing said cyclopentane and passing the vapors at a temperature within the range of 500–700° C. under pressures of from 0.25 to 1 atmosphere absolute for times of from 0.5 to 6 seconds over a granular catalyst comprising essentially a major proportion of activated alumina supporting a minor proportion of chromium sesquioxide, recovering cyclopentadiene from the products and returning unconverted cyclopentane to further dehydrogenation.

ARISTID V. GROSSE.
JULIAN M. MAVITY.